(12) United States Patent
Lehman et al.

(10) Patent No.: US 9,946,644 B2
(45) Date of Patent: Apr. 17, 2018

(54) MEMORY SYSTEM AND OPERATING METHOD THEREOF

(71) Applicant: SK hynix Inc., Gyeonggi-do OT (KR)

(72) Inventors: Curtis Lehman, Longmont, CO (US); Frank Liao, Sunnyvale, CA (US)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/081,668

(22) Filed: Mar. 25, 2016

(65) Prior Publication Data

US 2016/0283397 A1 Sep. 29, 2016

Related U.S. Application Data

(60) Provisional application No. 62/138,279, filed on Mar. 25, 2015.

(51) Int. Cl.
*G06F 12/00* (2006.01)
*G06F 12/02* (2006.01)
*G06F 12/1027* (2016.01)

(52) U.S. Cl.
CPC ...... *G06F 12/0246* (2013.01); *G06F 12/1027* (2013.01); *G06F 2212/7201* (2013.01); *G06F 2212/7202* (2013.01); *G06F 2212/7205* (2013.01)

(58) Field of Classification Search
None
See application file for complete search history.

(56) References Cited

U.S. PATENT DOCUMENTS

| 2011/0131365 | A1  | 6/2011 | Zhang et al. |
| 2015/0046665 | A1* | 2/2015 | Higgins ............... G06F 3/0619 711/158 |
| 2016/0034227 | A1* | 2/2016 | Olbrich ............... G06F 13/1657 711/103 |

FOREIGN PATENT DOCUMENTS

| KR | 1020070091452 | 9/2007 |
| KR | 1020130034830 | 4/2013 |

* cited by examiner

*Primary Examiner* — Brian Peugh
(74) *Attorney, Agent, or Firm* — IP & T Group LLP (57) ABSTRACT

A memory system may include a memory device including a plurality of a super blocks, a list, and a controller suitable for updating the list with block information regarding one of the super blocks when a super block is opened or closed; and at power up, reading the block information from the list and rebuilding a logical block addressing (LBA) table based on the block information.

18 Claims, 7 Drawing Sheets

| Array Index 700 | Previous Super Block 702 |
|---|---|
| 0 | N/A |
| ... | N/A |
| 15 | 99 |
| ... | N/A |
| 35 | 15 |
| ... | N/A |
| 42 | 61 |
| ... | N/A |
| 61 | <END OF LIST> |
| ... | N/A |
| 99 | 42 |
| ... | N/A |
| X | N/A |

Status Information 704

| HOST OPEN BLOCK | 55 |
|---|---|
| GC OPEN BLOCK | 44 |
| CSB HEAD | 35 |

MEMORY SYSTEM AND OPERATING METHOD THEREOF

CROSS-REFERENCE TO RELATED APPLICATIONS

This application claims the benefit of U.S. Provisional Application No. 62/138,279 filed Mar. 25, 2015, the entire contents of which are incorporated herein by reference.

BACKGROUND

1. Field

Exemplary embodiments of the present disclosure relate to a memory system and an operating method thereof.

2. Description of the Related Art

The computer environment paradigm has shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, that is, a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

SUMMARY

Embodiments of the present disclosure are directed to a memory system and an operating method thereof capable of improving the performance of a memory device.

Aspects of the invention include a memory system. The memory system may include a memory device including a plurality of a super blocks, a list, and a controller suitable for updating the list with block information regarding one of the super block when a super block is opened or closed; and at power up, reading the block information from the list and rebuilding a logical block addressing (LBA) table based on the block information.

Further aspects of the invention include a method for operating a memory system. The methods may include updating a list with block information regarding one of a plurality of super blocks of a memory device when a super block is opened or closed, and, at power up, reading the block information from the list, rebuilding a logical block addressing (LBA) table based on the block information.

DETAILED DESCRIPTION

Various embodiments will be described below in more detail with reference to the accompanying drawing. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium, and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity technical material that is known in the technical fields related to the invention has not been described in detail so that the invention is not unnecessarily obscured.

Figure 1:
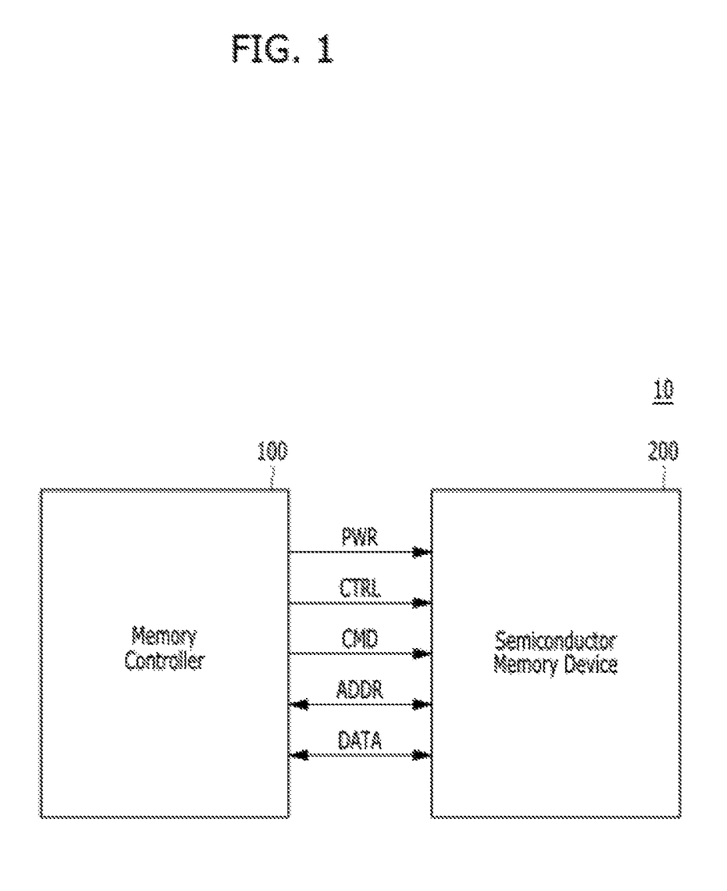
FIG. 1 is a block diagram schematically illustrating a memory system in accordance with an embodiment of the present invention.

FIG. 1 is a block diagram schematically illustrating a memory system 10 in accordance with an embodiment of the present invention.

Referring FIG. 1, the memory system 10 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines.

The semiconductor memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the semiconductor memory device 200 may be integrated in a single semiconductor device. For example, the memory controller 100 and the semiconductor memory device 200 may be integrated in a single semiconductor device such as a solid state drive (SSD). The solid state drive may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example, the memory system 10 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 2:
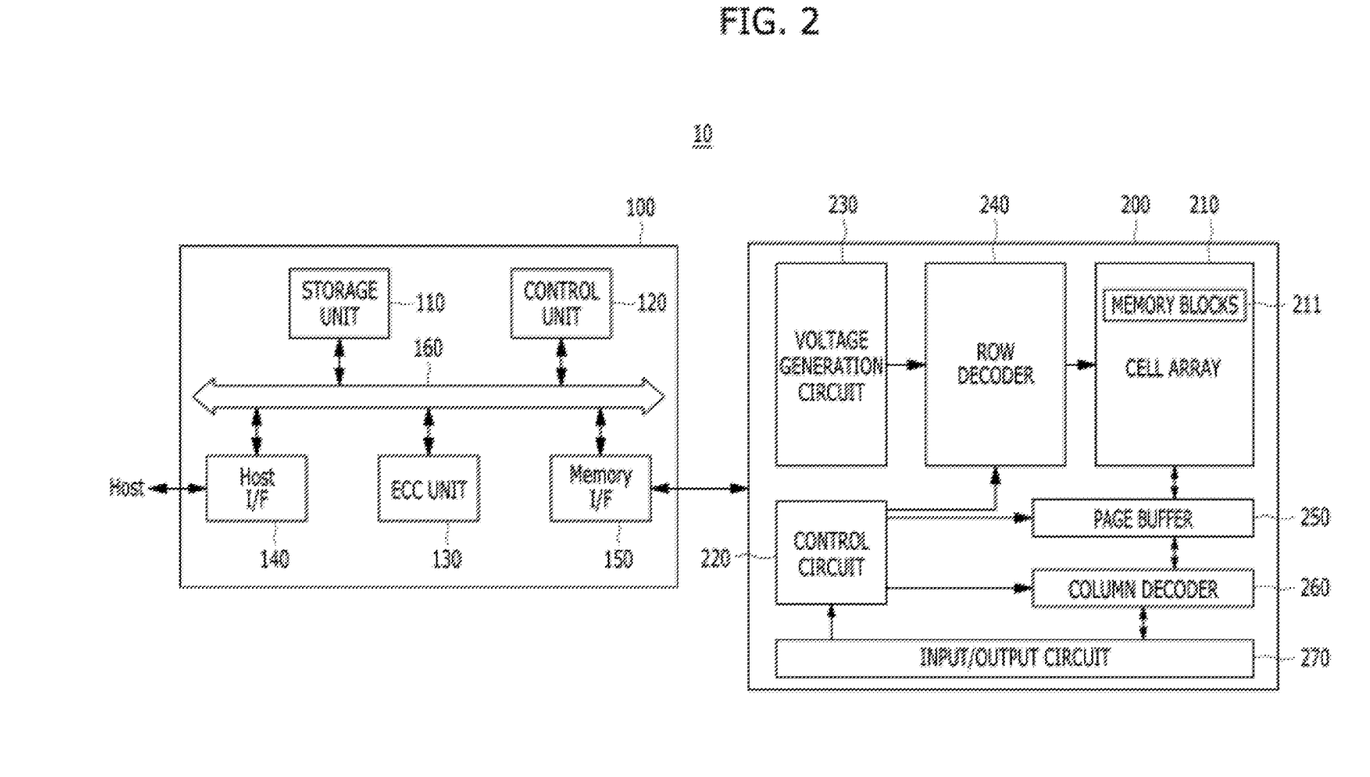
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player.

The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The controller 100 may control storage of data in the memory device 200. For example, the controller 100 may control the memory device 200 in response to a request from the host device. The controller 100 may provide the data read from the memory device 200, to the host device, and store the data provided from the host device into the memory device 200.

The controller 100 may include a storage unit 110, a control unit 120, the error correction code (ECC) unit 130, a host interface 140 and a memory interface 150, which are coupled through a bus 160.

The storage unit 110 may serve as a working memory of the memory system 10 and the controller 100, and store data for driving the memory system 10 and the controller 100. When the controller 100 controls operations of the memory device 200, the storage unit 110 may store data used by the controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data the storage unit 110 may inch de a program memory, a data memory, a write buffer, a read buffer, a map buffer, and so forth.

The control unit 120 may control general operations of the memory system 10, and a write operation or a read operation for the memory device 200, in response to a write request or a read request from the host device. The control unit 120 may drive firmware, which is referred to as a flash translation layer (FTL), to control the general operations of the memory system 10. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the memory device 200 during the read operation. The ECC unit 130 may not correct error bits when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

The host interface 140 may communicate with the host device through one or more of various interface protocols such as a universal serial bus (USB) a multi-media card (MMC), a peripheral component interconnect express (PCI-E), a small computer system interface (SCSI) a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240 a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230 and the plurality of memory blocks 211. The row decoder 240 may select at least one memory block among the plurality of memory blocks 211 in response to a row, address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 250 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260 or output data from the column decoder 260 to the external device, through the input/output circuit 270.

The control circuit 220 may control the peripheral circuit in response to the command and the address.

Figure 3:
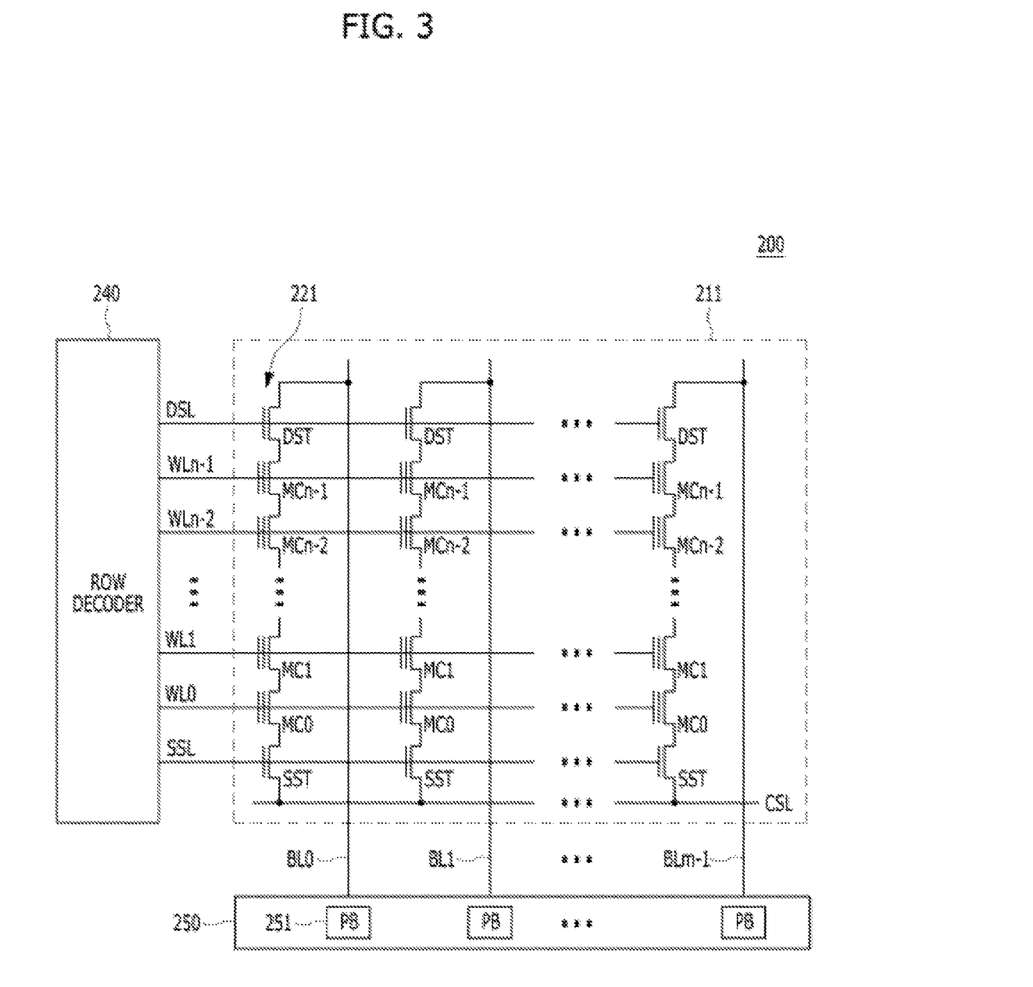
FIG. 3 is a circuit diagram illustrating a memory block of a memory device in accordance with an embodiment of the present invention.

FIG. 3 is a circuit diagram illustrating a memory block of a semiconductor memory device in accordance with an embodiment of the present invention. For example, a memory block of FIG. 3 may be the memory blocks 211 of the memory cell array 200 shown in FIG. 2.

Referring to FIG. 3, the memory blocks 211 may include a plurality of cell strings 221 coupled to bit lines BL0 to BLm-1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn-1 may be formed of a multi-level cell (MLC) storing data information of multiple bits in each cell. The cell strings 221 may be electrically coupled to the corresponding bit lines BL0 to BLm-1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Figure 4:
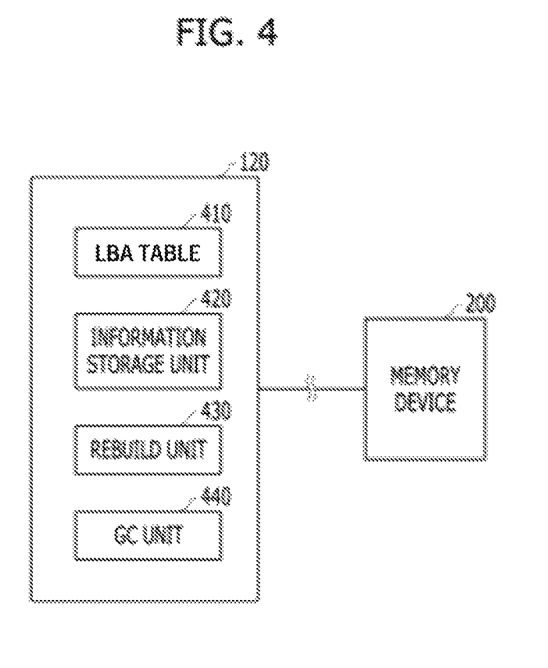
FIG. 4 is a diagram illustrating a control unit of a memory controller in accordance with an embodiment of the present invention.

FIG. 4 is a diagram illustrating a control unit of a memory controller in accordance with an embodiment of the present invention. For example, the control unit of FIG. 4 may depict the control unit 120 of the controller 100 in FIG. 2.

Referring to FIG. 4, the control unit 120 of the controller 100 may be coupled to the memory device 200 including a plurality of a super blocks through an interface (e.g., the memory interface 150 of FIG. 2).

The control unit 120 may include a logical block addressing (LBA) table 410, an information storage unit 420, a rebuild unit 430 and a garbage collection (GC) unit 440. The LBA table 410 may be a mapping table from logical block address (LBA) to physical address that is part of the flash translation layer (FTL). The rebuild unit 430 may be configured to rebuild the LBA table 410 based on information during SPOR. The GC unit 440 may perform any needed garbage collection operation during SPOR. It is noted that FIG. 4 merely illustrates that the control unit 120 includes elements for the operation with respect to SPOR.

Different from hard disks, the "erase-before-write" limitation of the memory device such as a flash memory requires a special layer of system software called a flash translation layer (FTL) to emulate a block device interface for backward compatibility. File systems and applications may use flash memory as if they were using a hard disk. Logical to Physical (L2P) mapping system known as logical block addressing (LBA) is part of the FTL.

Since a table for FTL or LBA (hereinafter LBA table) may be in a dynamic random access memory (DRAM), which is a volatile memory, when sudden power loss happens, the LBA table will be lost, which causes data loss. To prevent data loss, firmware must be able to rebuild the up-to-date table when power is on. Frequently writing the LBA table to the memory device (e.g., NAND flash memory) would cause significant write performance degradation. With limited performance degradation, how to perform fast sudden power-off recovery (SPOR) is an important and difficult task.

Embodiments and examples disclosed herein improve the performance of a memory system (e.g., a solid state drive (SSD)) and in particular the overall SPOR time (e.g., reduce the amount of time between when power is restored to the memory system after a sudden power loss and when a host is able to begin writing to the memory system).

During SPOR processes, both rebuilding a logical block address (LBA) table and doing any needed garbage collection (GC) are performed. Embodiments disclosed herein include methods, systems, processes and devices that reduce the number of super blocks needed to be read from a memory device (e.g., NAND flash memory) at power up as well as accelerating the performance of garbage collection.

Figure 5:
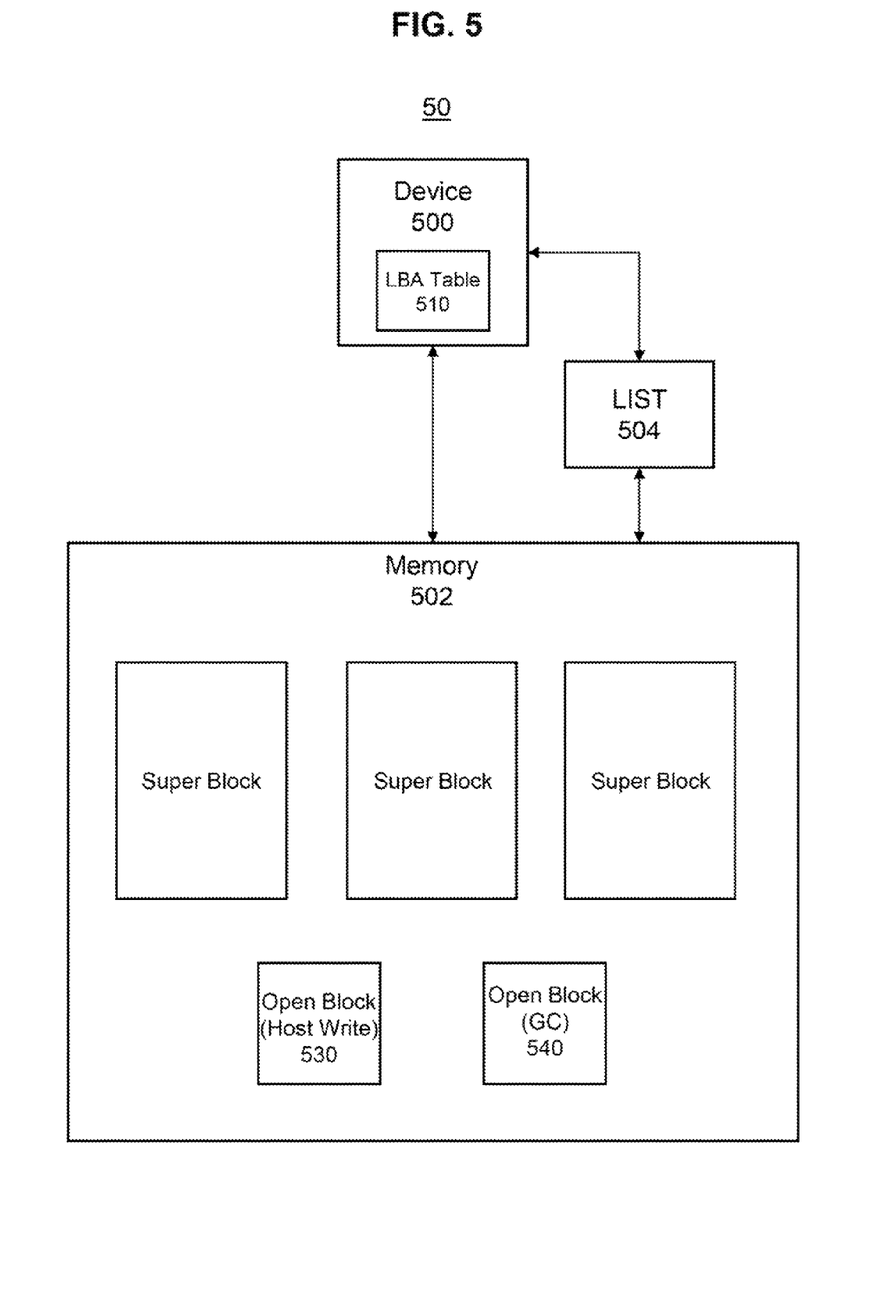
FIG. 5 is a diagram of a memory system in accordance with aspects of the invention.

Referring next to FIG. 5, a diagram of a system 50 is shown. The system 50 includes a device 500 and a memory 502. The device 500 may be controller a control unit, and/or other devices connected to or utilizing a memory (such as memory 502). The device 500 includes an LBA table 510. In the examples described herein, the device 500 may be housed on a volatile memory (e.g., a DRAM) such that, in the event of a sudden power loss, the LBA table 510 is required to be rebuilt.

The memory 502 includes, among other components, a plurality of super blocks, an open block for hose writes 530, an open block for garbage collection (GC) 540, etc. The memory 502 may be a NAND memory implemented as an SSD, or other types of suitable memory as will be understood to those of skill in the art from the description herein.

The system 50 also includes a list 504 that is populated with block information. The list 504 may be accessible by the device 500, the memory 502, and/or both. As depicted, the list 504 is housed separately from the device 500 and the memory 502. However, it is contemplated that the list 504 may be housed on the memory 502, or on other non-volatile sources. The list 504 is configured and housed such that it does not lose the populated block information in the event of a sudden power loss.

The block information may include regarding a super block that is open for host writes (e.g., the index number of the host write open block 530), a super block that is open for GC (e.g., the index number of the GC open block 540), a list of index numbers of closed super blocks (including the write type of each block), a list of index numbers of open super blocks, etc. As is understood, a closed super block is a super block that is closed from further data writes.

In the event of a sudden power loss, data on the LBA table 510 will be lost and it will need to be rebuilt. Previous rebuilding procedures or SPOR processes require time consuming steps, such as requiring hardware (e.g., memory 502) access to read every super block and to identify closed and open blocks by reading every valid block from previous signature scans. Bubble sorting of valid blocks may also be required, which again is time consuming.

To reduce or remove the time consuming steps, aspects of the invention include saving important block information to a list (e.g., list 504) that is housed on a non-volatile environment (e.g., sometimes referred to herein as "save off"). Such aspects of the invention advantageously eliminate the requirements of scanning the signature of every super block and scanning the meta page of every valid block. The invention also creates a list of super blocks to use for the LBA rebuild without first having to access or sort scanned signatures, meta pages, valid blocks, all super blocks, etc. Additional properties or status information of the memory may also be gained, such as determining that any super block not identified in the list 504 as either a closed super block host write open block 530, or GC open block 540 is erased.

Figure 6:
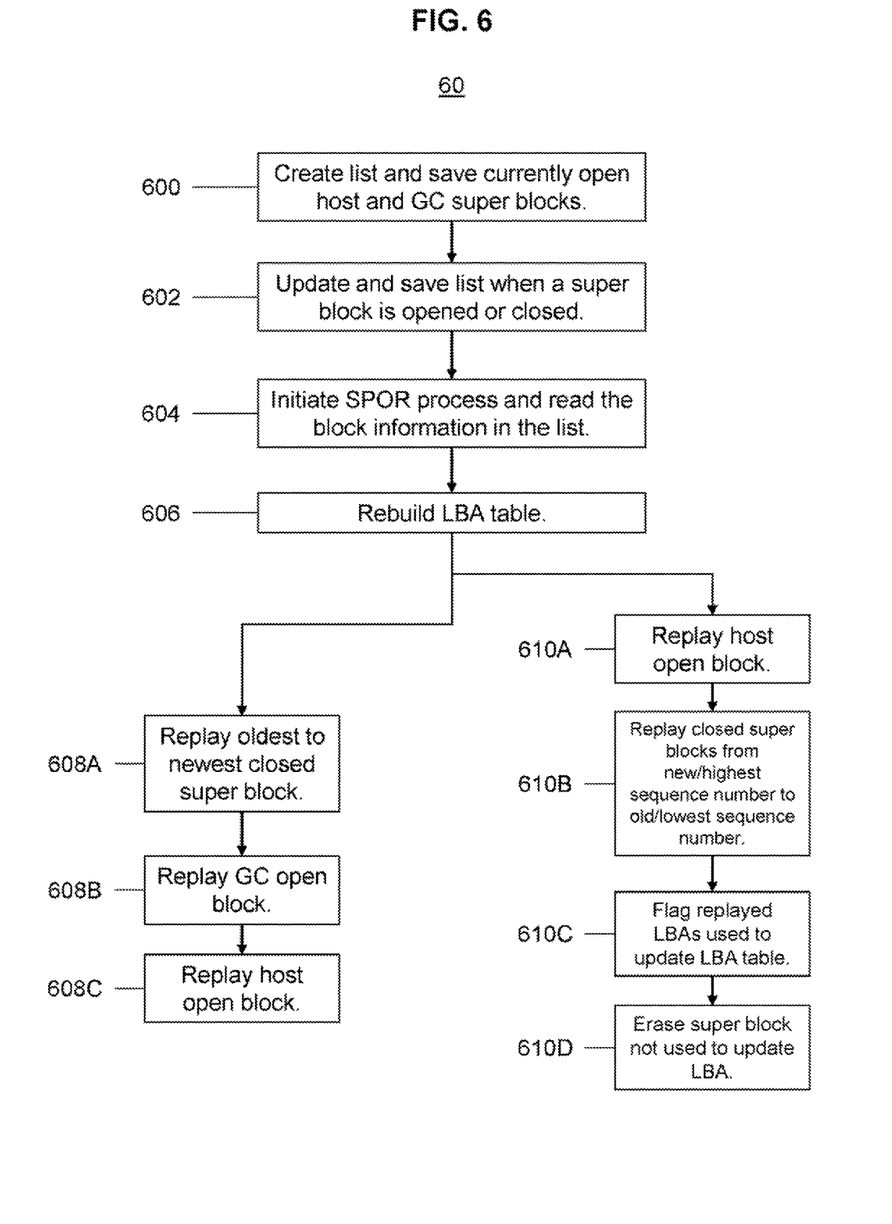
FIG. 6 is a flowchart illustrating steps in a method for improving recovery time after sudden power loss in accordance with aspects of the invention.
Figure 7:
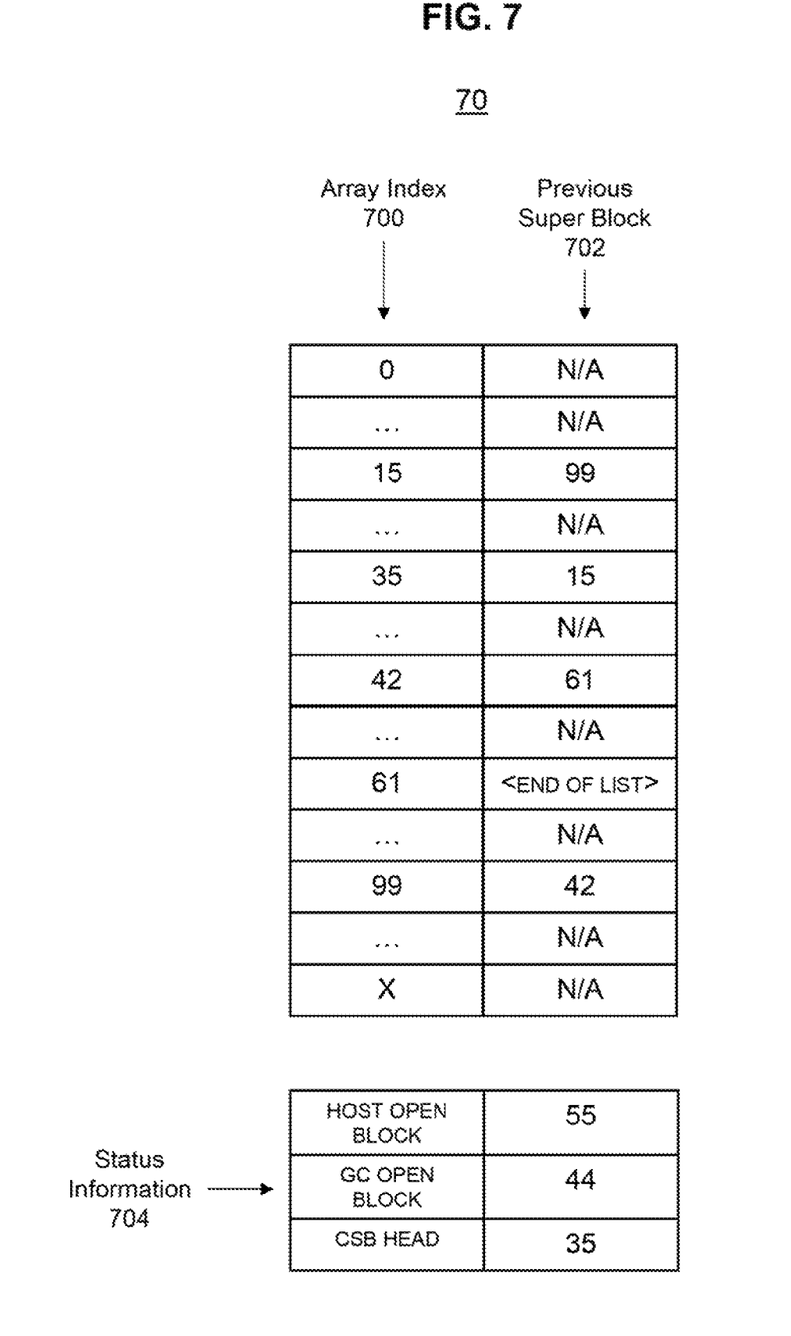
FIG. 7 is a diagram of an example of a list in accordance with aspects of the invention.

FIG. 6 is a flowchart 60 of steps for improving rebuild time following a sudden power loss. FIG. 7 is an example of a list 70 (e.g., list 504) used in the method of flowchart 60. The list 70 includes an array index 700, a previous super block section 702, and a status information section 704.

Referring to FIG. 6, at step 600, a list is created and current open host and GC super blocks are saved. The list that is created may be similar to list 504, list 70, etc. For example, the list 70 includes an array index 700 which is populated with the index numbers of super blocks, from super block 0 to super block X. The list includes a previous super block section 702. The list 70 also includes a status information section 704. The list 70 identifies which super blocks are closed, the write type of each closed super block, the currently open host super block (e.g., HOST OPEN BLOCK in the status information section 704), and the currently open GC super block (e.g., GC OPEN BLOCK in the status information section 704).

In the example shown in FIG. 7, the super block with index of 55 is the host open block and that block information is saved to the list 70. The super block with index of 44 is the GC open block and that block information is saved to the list 70. The super block with the index of 35 is the most recently closed super block (CSB HEAD) and that block information is saved to the list 70.

At step 602, the list is updated and saved when a super block is opened or closed. When a super block is full (or for other reasons), the super block is closed. Thus, for example, when the host open block is full, it is closed. Referring to the example list 70, in a previous iteration, when the super block 15 was closed, that information was stored as the CSB HEAD in the status information section 704. A new block with index 35 was opened and the block information was stored as the HOST OPEN BLOCK in the status information section 704. The list 70 was further updated such that the block information of the previous super block section 702 corresponding to the super block with index of 35 is populated with the block information 15. Thus, the list 70 is updated to reflect that the most recently closed block was the block with index 15, the currently open host block is the block with index 35, and the block that was open previously to block 35 being open is the block with the index of 15. In addition a sum of the LBAs written may be saved and updated to the list 70.

At step 604, a SPOR process is initiated and block information from the list is read. Following a sudden power loss, the data in the LBA table requires rebuilding. On power up, the SPOR process initiates by reading the list 70 to determine the super blocks to use to rebuild the LBA table. After reading the saved block information in the list 70, the order in which the super blocks were closed and hence, their age and sequence, will be known. By having this block information (e.g., the closed blocks and the open blocks), it may be concluded that any other super block is in the erased or invalid state.

Referring to the example list 70, the block information may be used as followed in order to initiated the SPOR process. Reading the block information from the status information section 704 shows that, at the time of the sudden power loss, the open block for host writes was the super block with index 55, the open block for GC was the super block with index 44, and the most recently closed super block was the super block with index 35. Reading the block information from the array index section 700 and previous super block section 702 shows that the block with index 15 was closed before 35, the block with index 99 was closed before 15, the block with index 42 was closed before 99, the block with index 61 was closed before 42, and the block with index 61 was the first closed block.

With the block information read from the list, at step 606, the LBA table may be rebuilt. In accordance with embodiments of the invention, the LBA table may be rebuilt by step 608 and/or step 610.

In step 608, the LBA is table rebuilt by replaying the super blocks from oldest to newest (substep 608A), then replaying the GC open block (substep 608B) and the replaying the host write open block (substep 608C). Step 608 may require the firmware of the memory device/system to replay each closed super block. The process of step 608 advantageously does not require reading free blocks or checking every LBA to see if the LBA has already been written, as it will already be known from which sequence number the system must resume, and it does not require hardware changes.

An alternative process for rebuilding the LBA table is shown at step 610. At step 610, the host write open block is replayed (substep 610A), then the closed super blocks are replayed from either newest to oldest or highest sequence number to lowest sequence number (substep 610B). If any replayed LBA has been used to update the LBA table, then it is flagged (substep 610C) so that every LBA does not need to be checked to see if it has already been written. Then, each super block not used to update the LBA may be identified and erased (substep 610D) as being out of date.

The process of step 610 advantageously writes each LBA only once and allows discontinuation of reading the closed super blocks once all the LBAs are written. In an embodiment, a sum of the LBAs written may be saved to the list 70 at the time the block information is updated (e.g., step 602). Further, it is possible to identify which closed blocks can be erased, permitting only one scan of closed blocks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A memory system comprising:
   a memory device including a plurality of a super blocks;
   a list; and
   a controller suitable for:
      updating the list with block information regarding one of the super blocks when a super block is opened or closed; and
      at power up, reading the block information from the list and rebuilding a logical block addressing (LBA) table based on the block information by replaying closed super blocks, replaying a garbage collection open super block, and replaying a host write open super block.

2. The memory system of claim 1, wherein the block information includes information regarding a host write open super block, a garbage collection open super block, or a recently closed super block.

3. The memory system of claim 1, wherein the block information includes an index of a previously closed super block.

4. The memory system of claim 1, wherein the controller is suitable for rebuilding the LBA table by replaying closed super blocks in order from oldest to newest.

5. The memory system of claim 1, wherein the controller is suitable for rebuilding the LBA table based on the block information by replaying a host write open super block and then replaying closed super blocks.

6. The memory system of claim 5, wherein the controller is suitable rebuilding the LBA table by replaying the closes super blocks in the order from newest or highest sequence number to oldest or lowest sequence number.

7. The memory system of claim 5, wherein the controller is suitable for rebuilding the LBA table by flagging replayed LBAs used to update the LBA table.

8. The memory system of claim 7, wherein the controller is suitable for updating the list with a sum of LBAs written.

9. The memory system of claim 1, wherein the list is housed on a non-volatile environment.

10. A method for operating a memory system comprising:
    updating a list with block information regarding one of a plurality of super blocks of a memory device when a super block is opened or closed; and
    at power up,
       reading the block information from the list; and
       rebuilding a logical block addressing (LBA) table based on the block information by replaying closed super blocks, replaying a garbage collection open super block, and replaying a host write open super block.

11. The method of claim 10, wherein the block information includes information regarding a host write open super block, a garbage collection open super block, or a recently closed super block.

12. The method of claim 10, wherein the block information includes an index of a previously closed super block.

13. The method of claim 10, wherein replaying the closed super blocks includes replaying the closed super blocks in order from oldest to newest.

14. The method of claim 10, wherein rebuilding of the LBA table based on the block information includes:
    replaying a host write open super block; and then
    replaying closed super blocks.

15. The method of claim 14, wherein replaying of the closed super blocks comprises replaying the closed super blocks from newest or highest sequence number to oldest or lowest sequence number.

16. The method of claim 14, wherein rebuilding the LBA table includes flagging replayed LBAs used to update the LBA table.

17. The method of claim 16, further comprising updating the list with a sum of LBAs written.

18. The method of claim 10, wherein the list is housed on a non-volatile environment.

* * * * *